US010022867B2

(12) United States Patent
Saboo et al.

(10) Patent No.: US 10,022,867 B2
(45) Date of Patent: Jul. 17, 2018

(54) DYNAMICALLY MAINTAINING A MAP OF A FLEET OF ROBOTIC DEVICES IN AN ENVIRONMENT TO FACILITATE ROBOTIC ACTION

(71) Applicant: X Development LLC, Mountain View, CA (US)

(72) Inventors: Rohit Ramesh Saboo, Mountain View, CA (US); James Joseph Kuffner, Sunnyvale, CA (US); Julian Mason, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/863,620

(22) Filed: Sep. 24, 2015

(65) Prior Publication Data

US 2016/0129592 A1    May 12, 2016

Related U.S. Application Data

(60) Provisional application No. 62/078,250, filed on Nov. 11, 2014.

(51) Int. Cl.
*B25J 9/16*  (2006.01)
*G05D 1/02*  (2006.01)
(Continued)

(52) U.S. Cl.
CPC ............ *B25J 9/1661* (2013.01); *B25J 9/0084* (2013.01); *B25J 9/1674* (2013.01);
(Continued)

(58) Field of Classification Search
CPC ...... B25J 9/1661; B25J 9/0084; B25J 9/1674; G06Q 50/28; G05B 19/41895;
(Continued)

(56) References Cited

U.S. PATENT DOCUMENTS

| | | |
|---|---|---|
| 5,239,931 A | 8/1993 | Muselli et al. |
| 5,506,682 A | 4/1996 | Pryor |

(Continued)

FOREIGN PATENT DOCUMENTS

| | | |
|---|---|---|
| AU | 2010235933 | 10/2010 |
| DE | 10 2012 020973 A1 | 4/2013 |

(Continued)

OTHER PUBLICATIONS

International Search Report and Written Opinion of International Application No. PCT/US2015/054187 dated Feb. 15, 2016.
(Continued)

*Primary Examiner* — Michael Collins
(74) *Attorney, Agent, or Firm* — McDonnell Boehnen Hulbert & Berghoff LLP

(57) ABSTRACT

Methods and systems for dynamically maintaining a map of robotic devices in an environment are provided herein. A map of robotic devices may be determined, where the map includes predicted future locations of at least some of the robotic devices. One or more robotic devices may then be caused to perform a task. During a performance of the task by the one or more robotic devices, task progress data may be received from the robotic devices, indicative of which of the task phases have been performed. Based on the data, the map may be updated to include a modification to the predicted future locations of at least some of the robotic devices. One or more robotic devices may then be caused to perform at least one other task in accordance with the updated map.

19 Claims, 11 Drawing Sheets

(51) Int. Cl.
G06Q 50/28 (2012.01)
B25J 9/00 (2006.01)
G05B 19/418 (2006.01)

(52) U.S. Cl.
CPC ..... *G05B 19/41895* (2013.01); *G05D 1/0274* (2013.01); *G05D 1/0297* (2013.01); *G06Q 50/28* (2013.01); *G05B 2219/31006* (2013.01); *G05B 2219/31007* (2013.01); *G05B 2219/45056* (2013.01); *G05D 2201/0216* (2013.01); *Y02P 90/285* (2015.11); *Y02P 90/60* (2015.11)

(58) Field of Classification Search
CPC ........... G05B 2219/31006; G05B 2219/31007; G05B 2219/450456; G05D 1/0297; G05D 1/0274; G05D 2201/0216; Y02P 90/285; Y02P 90/60
USPC .................................................. 700/245–255
See application file for complete search history.

(56) References Cited

U.S. PATENT DOCUMENTS

| | | | | |
|---|---|---|---|---|
| 5,825,981 | A * | 10/1998 | Matsuda | G05B 19/41815 318/568.16 |
| 6,909,940 | B2 | 6/2005 | Hellman et al. | |
| 7,602,143 | B2 | 10/2009 | Capizzo | |
| 7,646,336 | B2 | 1/2010 | Tan et al. | |
| 8,322,591 | B2 | 12/2012 | Diez et al. | |
| 8,403,614 | B2 | 3/2013 | Bastian, II et al. | |
| 8,508,590 | B2 | 8/2013 | Laws et al. | |
| 8,594,834 | B1 | 11/2013 | Clark et al. | |
| 8,594,923 | B2 * | 11/2013 | Wong | G01C 21/206 701/409 |
| 8,639,644 | B1 * | 1/2014 | Hickman | G06N 3/008 700/245 |
| 9,050,723 | B1 | 6/2015 | Elazary et al. | |
| 9,120,622 | B1 * | 9/2015 | Elazary | B65G 1/1373 |
| 9,682,481 | B2 * | 6/2017 | Lutz | B25J 9/1697 |
| 2008/0131255 | A1 | 6/2008 | Hessler et al. | |
| 2011/0106294 | A1 | 5/2011 | Bebbington | |
| 2012/0152877 | A1 * | 6/2012 | Tadayon | B25J 5/02 212/224 |
| 2012/0191272 | A1 | 7/2012 | Anderson et al. | |
| 2013/0009592 | A1 | 1/2013 | Larsen et al. | |
| 2013/0123980 | A1 | 5/2013 | Seo | |
| 2013/0184849 | A1 | 7/2013 | Chan | |
| 2013/0317642 | A1 | 11/2013 | Asaria et al. | |
| 2014/0074342 | A1 | 3/2014 | Wong et al. | |
| 2014/0163730 | A1 | 6/2014 | Mian | |
| 2014/0277691 | A1 | 9/2014 | Jacobus et al. | |
| 2015/0367513 | A1 * | 12/2015 | Gettings | G06Q 10/06 700/248 |

FOREIGN PATENT DOCUMENTS

| | | |
|---|---|---|
| WO | 2007047510 A2 | 4/2007 |
| WO | 2013119942 A1 | 8/2013 |

OTHER PUBLICATIONS

Laput et al., "Zensors: Adaptive, Rapidly Deployable, Human-Intelligent Sensor Feeds".
Simpson, "Behavior trees for AI: How they work", http://www.gamasutra.com/blogs/ChrisSimpson/20140717/221339/Behavior_trees_for_AI_How_the . . . , Jul. 17, 2014.
Anthony G. Francis, Jr., "Context-Sensitive Asynchronous Memory", Aug. 2000.
Marzinotto et al., "Towards a Unified Behavior Trees Framework for Robot Control".
Colledanchise et al., "Adaptive Fault Tolerant Execution of Multi-Robot Missions using Behavior Trees", Feb. 10, 2015.
Kiva Systems, "Defying the Laws of Fulfillment, The KIVA Mobile Fulfillment System," http://www.kivasystems.com/media/45933/kiva%20systems%20brochure%20-%20defying%20the%20laws%20of%20fulfillment.pdf, 2007, pp. 1-8.
Swieringa et al., "Autonomous Battery Swapping System for Small-Scale Helicopters," 2010 IEEE International Conference on Robotics and Automation, Anchorage Convention District, May 3-8, 2010, Anchorage, Alaska USA, pp. 3335-3340.

* cited by examiner

DYNAMICALLY MAINTAINING A MAP OF A FLEET OF ROBOTIC DEVICES IN AN ENVIRONMENT TO FACILITATE ROBOTIC ACTION

CROSS-REFERENCE TO RELATED APPLICATION

The present disclosure claims priority to U.S. Provisional Application No. 62/078,250, filed on Nov. 11, 2014, the entire contents of which are herein incorporated by reference.

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may have machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

Example systems and methods may provide for dynamically maintaining a map of a fleet of robotic devices in a physical environment, such as a warehouse. More specifically, a system configured to manage the fleet of robotic devices may determine a map of the environment indicating locations at which at least a portion of the fleet is predicted to be in the future. Over time, robotic devices of the fleet may operate in coordination with each other in the environment. For instance, robotic devices may cooperatively move objects from one location in the environment to another. As the robotic devices operate in the environment, the robotic devices may send data to the system. Within examples, such data may include updated locations of the robotic devices in the environment and/or may include an update to a status of a task that the robotic devices are performing. The system can then use the data to adjust the predicted locations, make updates to the map, and send the updates to various robotic devices of the fleet to facilitate further operation of the fleet in the environment.

In one aspect, the present application describes a method. The method may involve determining a map of a plurality of robotic devices within a physical environment, where the map includes predicted future locations of at least some of the plurality of robotic devices. The method may also involve causing one or more robotic devices of the plurality to perform a task comprising one or more task phases. The method may further involve during a performance of at least one of the one or more task phases by the one or more robotic devices, receiving, from the one or more robotic devices, task progress data indicative of which of the one or more task phases have been performed by the one or more robotic devices. The method may still further involve, based on the received task progress data, updating the map of the plurality of robotic devices within the physical environment, where the updated map includes at least one modification to the predicted future locations of at least some of the plurality of robotic devices. The method may yet still further involve, causing the one or more robotic devices to perform at least one other task phase in accordance with the updated map.

In another aspect, the present application describes a system. The system may comprise a plurality of robotic devices within a physical environment, at least one processor, and data storage comprising instructions executable by the at least one processor to cause the system to perform operations. The operations may include determining a map of the plurality of robotic devices within the physical environment, where the map includes predicted future locations of at least some of the plurality of robotic devices. The operations may also include causing one or more robotic devices of the plurality to perform a task comprising one or more task phases. The operations may further include, during a performance of at least one of the one or more task phases by the one or more robotic devices, receiving, from the one or more robotic devices, task progress data indicative of which of the one or more task phases have been performed by the one or more robotic devices. The operations may still further include, based on the received task progress data, updating the map of the plurality of robotic devices within the physical environment, where the updated map includes at least one modification to the predicted future locations of at least some of the plurality of robotic devices. The operations may yet still further include, causing the one or more robotic devices to perform at least one other task phase in accordance with the updated map.

In still another aspect, the present application describes a system comprising a plurality of robotic devices configured to manipulate a plurality of objects within a physical environment, at least one processor, and data storage comprising instructions executable by the at least one processor to cause the system to perform operations. The operations may include determining a map of the plurality of objects undergoing manipulation by the plurality of robotic devices within the physical environment, where the map includes predicted future locations of at least some of the plurality of objects. The operations may also include causing one or more robotic devices of the plurality to perform a task comprising one or more task phases. The operations may further include during a performance of at least one of the one or more task phases by the one or more robotic devices, receiving, from the one or more robotic devices, task progress data indicative of which of the one or more task phases have been performed by the one or more robotic devices. The operations may still further include, based on the received task progress data, updating the map of the plurality of objects undergoing manipulation by the plurality of robotic devices within the physical environment, where the updated map includes at least one modification to the predicted future locations of at least some of the plurality of objects.

In yet another aspect, a system is provided that includes a means for determining a map of a plurality of robotic devices within a physical environment, where the map includes predicted future locations of at least some of the plurality of robotic devices. The system may also include a means for causing one or more robotic devices of the plurality to perform a task comprising one or more task phases. The system may further include a means for during a performance of at least one of the one or more task phases by the one or more robotic devices, receiving, from the one or more robotic devices, task progress data indicative of which of the one or more task phases have been performed by the one or more robotic devices. The system may still further include a means for, based on the received task progress data, updating the map of the plurality of robotic devices within the physical environment, where the updated map includes at least one modification to the predicted future locations of at least some of the plurality of robotic devices. The system may yet still further include a means for causing the one or more robotic devices to perform at least one other task phase in accordance with the updated map.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1A:
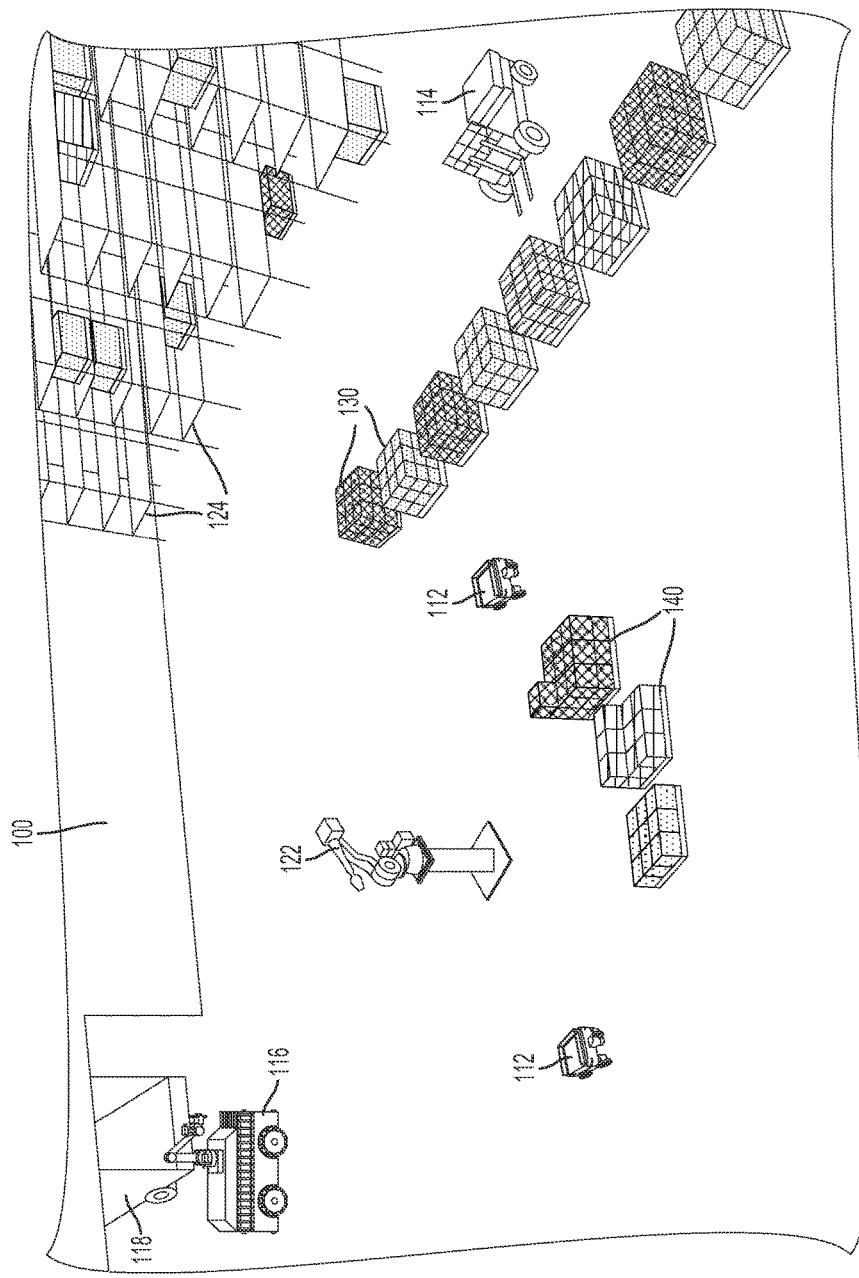
FIG. 1A shows a robotic fleet, according to an example embodiment.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

An example arrangement includes a heterogeneous fleet of robotic devices that occupy a physical environment and a control system configured to manage the robotic devices of the fleet. The control system may determine an initial map of the fleet of robotic devices. Such a map may include various forms of information, such as current locations of one or more robotic devices of the fleet and/or anticipated locations and trajectories of where the robotic devices are likely or certain to be at times in the future. Further, the information may include current and anticipated future locations of objects as well, such as packages or other objects that can be manipulated in a physical environment such as a warehouse or factory. Still further, the information can include information about fixed locations or structures within the environment as well, such as recognizable patterns and textures present at such locations and/or on such structures.

The control system may use high-level planning to initially predict where robotic devices may be located in the future and when the robotic devices will be at those locations. For instance, the control system may plan for boxes to be taken from a storage facility and loaded onto a truck for shipment. Thus, the control system may predict that a group of robotic devices may work in coordination with each other at various locations in the environment in order to transport the boxes from the facility to the truck. The control system may make such initial predictions in other manners as well.

The control system may assign tasks to be performed by various robotic devices of the fleet, such as maneuvering within the environment, delivering objects from one location to another, moving an obstacle out of the way of other robotic devices, among other possibilities. Over time, as robotic devices of the fleet are performing tasks assigned to them by the control system, the robotic devices may provide, or "publish," task progress data to the control system. Such task progress data may serve as a means to notify the control system of a current status of a task being performed, such as when and where one or more phases of the task have been completed by the robotic devices and/or where, when, and how the robotic devices have deviated from an assigned task (e.g., due to a device malfunction, being delayed by an obstacle, being delayed by another robotic device being late in performing an associated task phase, etc.). The task progress data may serve as a means to notify the control system of other information as well, such as the locations of objects or other robotic devices in the environment.

The initial map may be dynamically updated based on the task progress data received by the control system from members of the fleet of robotic devices, thereby making the map a collaboratively maintained map. In particular, based on the task progress data received from the robotic devices of the fleet, the control system may make adjustments to the initially-predicted future locations (and possibly adjust initially-predicted times at which robotic devices are expected to reach the initially-predicted future locations) and update the map accordingly. For example, if the task progress data indicates that a robotic device has to alter its route in order to avoid a newly-discovered obstacle, the control system may reflect this alteration in the updated map. As another example, if the task progress data indicates that a first robotic device has successfully handed off an object to a second robotic device ahead of schedule, where the second robotic device is to then travel to a handoff location to hand off the object to be transported by a third robotic device, the control system may update the second robotic device's predicted future location to reflect that the second robotic device is expected to arrive at the handoff location ahead of schedule. Other examples are also possible.

The control system or other computing system may then provide, or "publish," the updated map to the fleet of robotic devices to facilitate the performance of other tasks or other actions of the fleet in the environment. In particular, updated anticipated locations and trajectories of the fleet may facilitate collaborative, coordinated activity between one or more robotic devices. For instance, the updated map may enable robotic devices to perform a coordinated task, such as a manipulation of an object, avoiding a collision with other robotic devices and objects, or searching for a lost object.

A dynamically and collaboratively maintained map may serve various purposes. By way of example, a first robotic device of the fleet may be given instructions by a control system to perform a task, such as transporting an object to be manipulated by a second robotic device of the fleet. In addition, the second robotic device may be given instructions by the global control system to perform a task after completion of the first task by the first robotic device (e.g., to receive the object from the first robotic device and bring the object to another location). Consequently, the actions of the first robotic device can affect the performance of the second robotic device. Thus, it may be desirable for the first robotic device to be provided with a map that includes a location where the second robotic device may be in the near future (e.g., a location at which the first robotic device can hand over the object to the second robotic device). Likewise, it may be desirable for the second robotic device to be provided with a map that includes a location where the first robotic device may be in the near future. In addition, because actions of some robotic devices may affect others, the map can be updated to reflect changes in predicted future locations of robotic devices, and thus an updated map can enable the first and second robotic devices to adjust their actions accordingly if necessary, and/or to prepare for subsequent tasks after the object has been handed over.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading/unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous robot fleet may be used in a warehouse setting for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, some pallets 130 may be positioned within the warehouse environment at chosen locations for certain periods of time to allow the pallets to be picked up, distributed, or otherwise processed by one or more of the robotic devices.

Figure 1B:
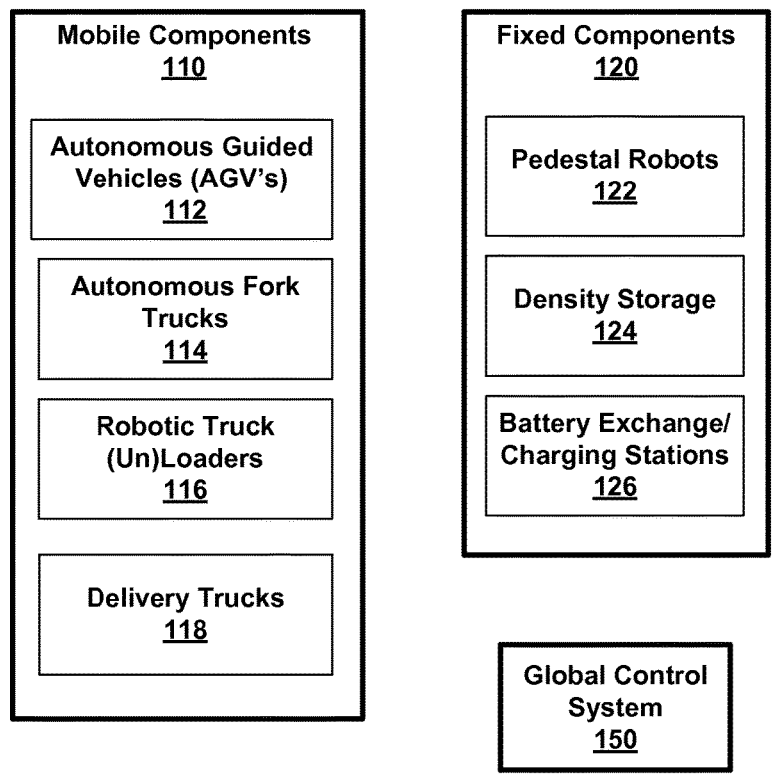
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

FIGS. 2A, 2B, 2C, and 2D illustrate several examples of robotic devices that may be included within a robotic warehouse fleet. Other robotic devices which vary in form from those illustrated here as well as other types of robotic devices may also be included.

Figure 2A:
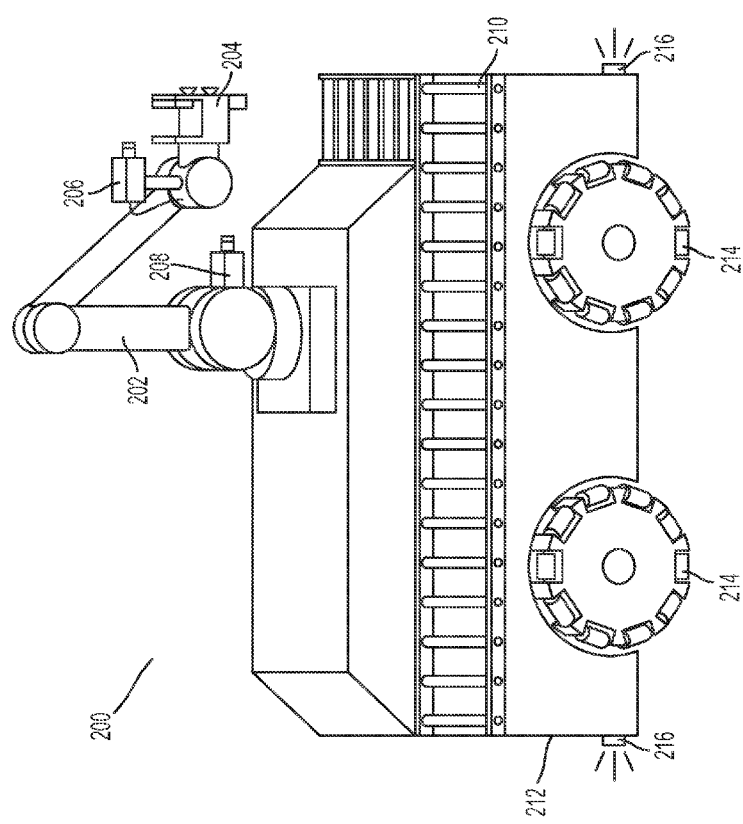
FIG. 2A shows a robotic truck unloader, according to an example embodiment.

FIG. 2A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 200 may include a robotic arm 202 with a gripping component 204 for gripping objects within the environment. The robotic arm 202 may use the gripping component 204 to pick up and place boxes to load or unload trucks or other containers. The truck unloader 200 may also include a moveable cart 212 with wheels 214 for locomotion. The wheels 214 may be holonomic wheels that allow the cart 212 to move with two degrees of freedom. Additionally, a wraparound front conveyor belt 210 may be included on the holonomic cart 212. In some examples, the wrap around front conveyer belt may allow the truck loader 200 to unload or load boxes from or to a truck container or pallet without having to rotate gripper 204.

In further examples, a sensing system of robotic truck unloader 200 may use one or more sensors attached to a robotic arm 202, such as sensor 206 and sensor 208, which may be two-dimensional (2D) sensors and/or 3D depth sensors that sense information about the environment as the robotic arm 202 moves. The sensing system may determine information about the environment that can be used by a control system (e.g., a computer that is running motion planning software) to pick and move boxes efficiently. The control system could be located on the device or could be in remote communication with the device. In further examples, scans from one or more 2D or 3D sensors with fixed mounts on a mobile base, such as a front navigation sensor 216 and a rear navigation sensor 218, and one or more sensors mounted on a robotic arm, such as sensor 206 and sensor 208, may be integrated to build up a digital model of the environment, including the sides, floor, ceiling, and/or front wall of a truck or other container. Using this information, the control system may cause the mobile base to navigate into a position for unloading or loading.

In further examples, the robotic arm 202 may be equipped with a gripper 204, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 200 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 2B:
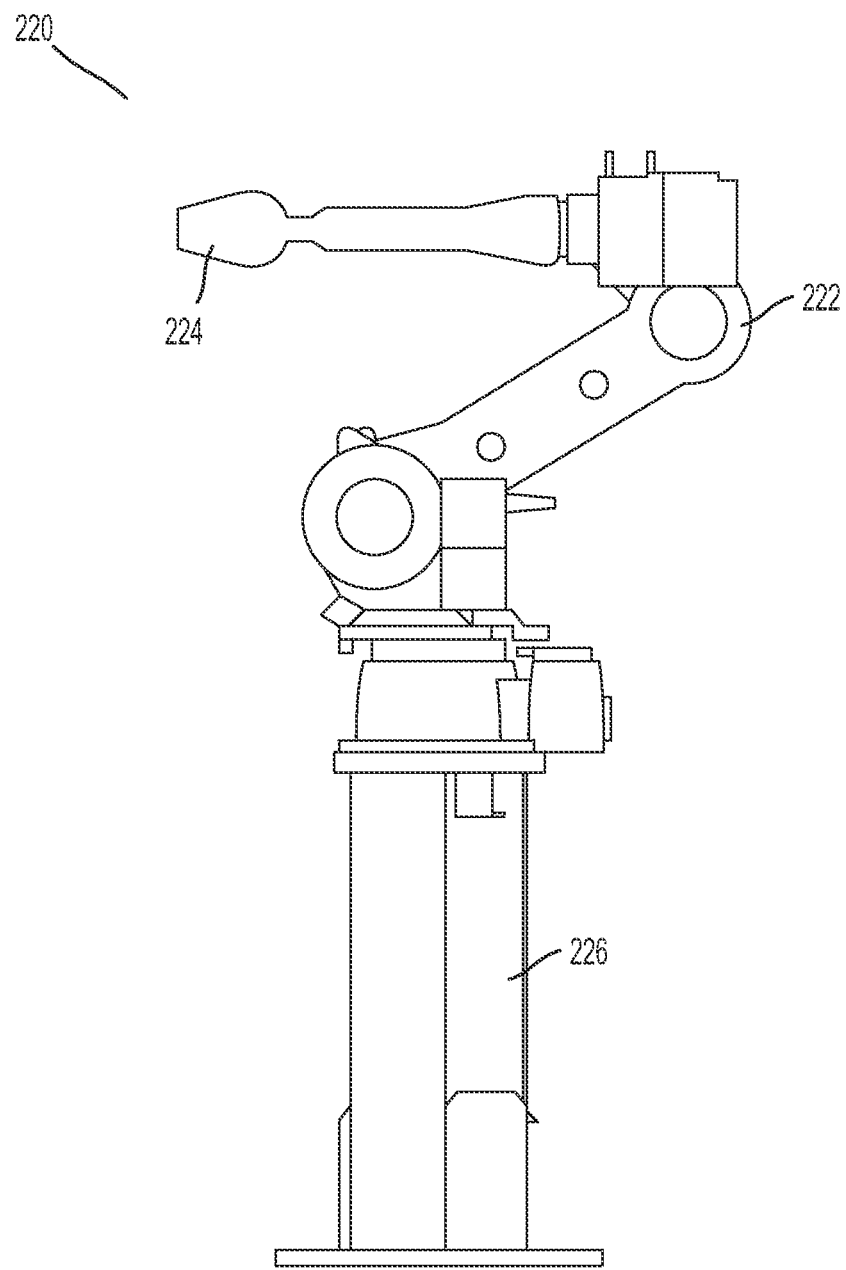
FIG. 2B shows a robotic arm on a pedestal, according to an example embodiment.

FIG. 2B illustrates a robotic arm on a pedestal, according to an example embodiment. More specifically, a pedestal robot 220 may be positioned within an environment such as a warehouse environment and used to pick up, move, and/or otherwise manipulate objects within reach. In some examples, the pedestal robot 220 may be specialized for heavy lifting without requiring batteries to operate. The pedestal robot 220 may include a robotic arm 222 with an end-effector-mounted gripper 224, which may be of the same type as the robotic manipulator 202 and gripper 204 described with respect to the robotic truck unloader 200. The robotic arm 222 may be mounted on a pedestal 226, which may allow the robotic arm 222 to easily pick up and move nearby packages, such as to distribute packages between different mobile robots. In some examples, the robotic arm 222 may also be operable to construct and/or deconstruct pallets of boxes. In further examples, the pedestal 226 may include an actuator to allow a control system to change the height of the robotic arm 222.

In further examples, a bottom surface of the pedestal robot 220 may be a pallet-shaped structure. For instance, the bottom surface may have dimension and shape roughly equivalent to other pallets used for object transport or storage within a warehouse. By shaping the bottom of the pedestal robot 220 as a pallet, the pedestal robot 220 may be picked up and moved to different locations within a warehouse environment by a pallet jack or different type of autonomous fork truck. For instance, when a delivery truck arrives at a particular docking port of the warehouse, a pedestal robot 220 may be picked up and moved to a location closer to the delivery truck to more efficiently process boxes coming from or going to the delivery truck.

In additional examples, the pedestal robot 220 may also include one or more visual sensors to identify boxes and/or other robotic devices within the vicinity of the pedestal robot 220. For instance, a control system of the pedestal robot 220 or a global control system may use sensor data from sensors on the pedestal robot 220 to identify boxes for the robotic arm 222 and gripper 224 of the pedestal robot 220 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 2C:
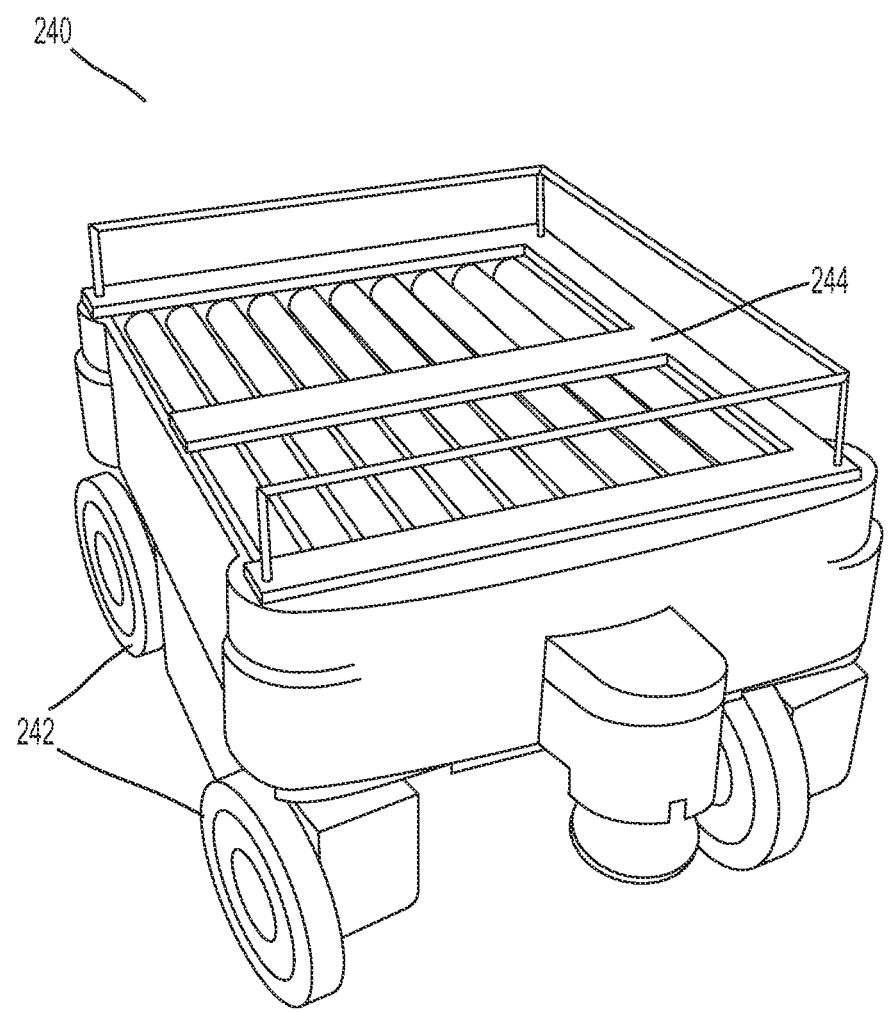
FIG. 2C shows an autonomous guided vehicle, according to an example embodiment.

FIG. 2C shows an autonomous guided vehicle (AGV), according to an example embodiment. More specifically, AGV 240 may be a relatively small, mobile robotic device that is capable of transporting individual boxes or cases. The AGV 240 may include wheels 242 to allow for locomotion within a warehouse environment. Additionally, a top surface 244 of the AGV 240 may be used to places boxes or other objects for transport. In some examples, the top surface 244 may include rotating conveyors to move objects to or from the AGV 240. In additional examples, the AGV 240 may be powered by one or more batteries that can be quickly recharged at a battery charging station and/or exchanged for fresh batteries at a battery exchange station. In further examples, the AGV 240 may additionally include other components not specifically identified here, such as sensors for navigation. AGVs with different shapes and sizes also may be included within a robotic warehouse fleet, possibly depending on the types of packages handled by a warehouse.

Figure 2D:
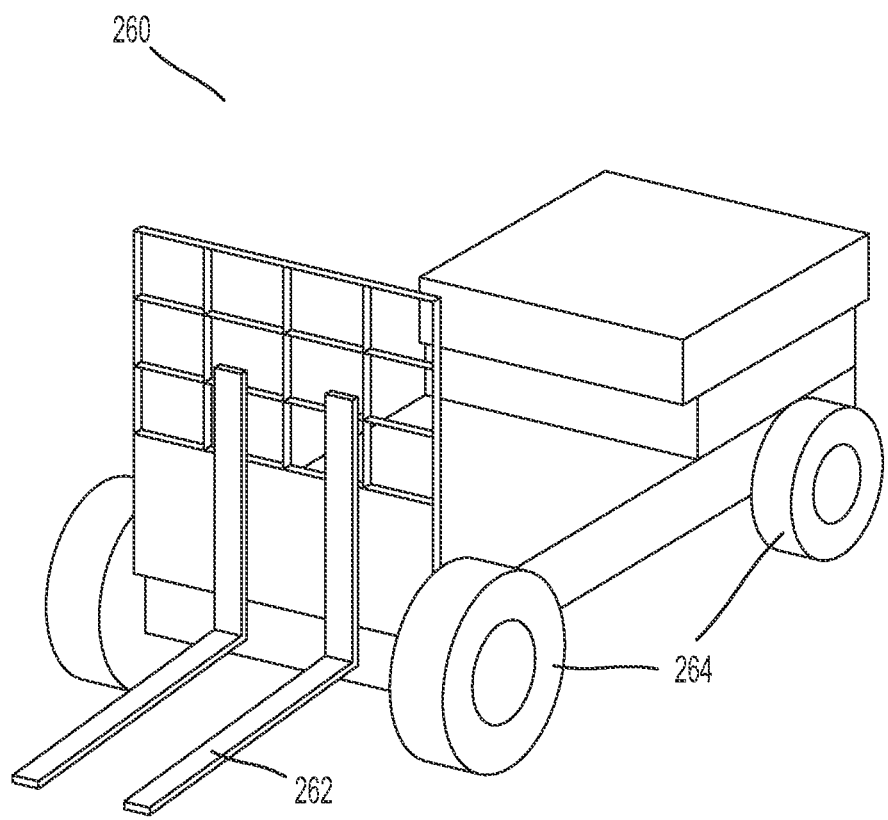
FIG. 2D shows an autonomous fork truck, according to an example embodiment.

FIG. 2D shows an autonomous fork truck, according to an example embodiment. More specifically, autonomous fork truck 260 may include a forklift 262 for lifting and/or moving pallets of boxes or other larger materials. In some examples, the forklift 262 may be elevated to reach different racks of a storage rack or other fixed storage structure within a warehouse. The autonomous fork truck 260 may additionally include wheels 264 for locomotion to transport pallets within the warehouse. In additional examples, the autonomous fork truck may include a motor and power supply as well as a sensing system, such as those described with respect to robotic truck unloader 200. The autonomous fork truck 260 may also vary in size or shape from the one illustrated in FIG. 2D.

Figure 3:
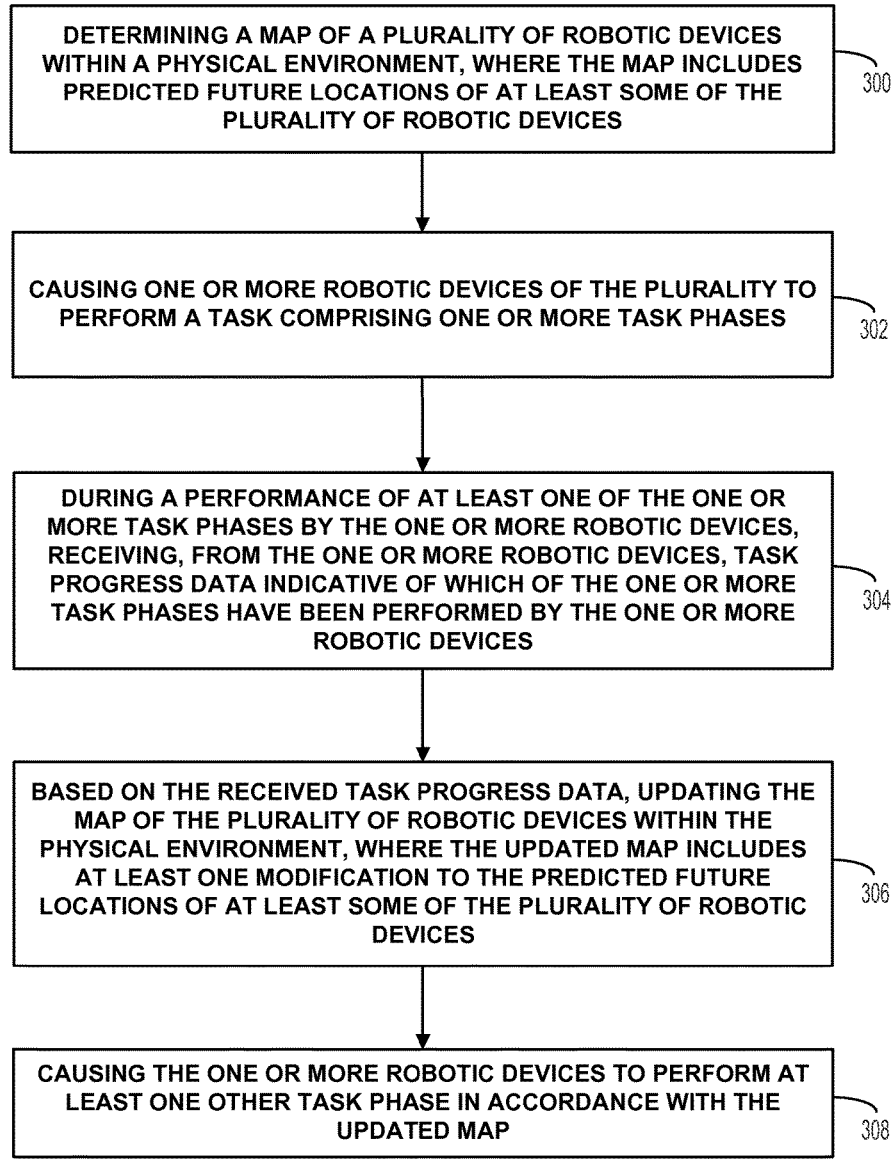
FIG. 3 is a flow chart of an example method, in accordance with at least some implementations described herein.

FIG. 3 is a flow chart of an example method, in accordance with at least some implementations described herein. The method shown in FIG. 3 presents an implementation of a method that, for example, could be used with the systems shown in FIGS. 1A, 1B, 2A, 2B, 2C, and 2D, for example, or may be performed by a combination of any components of those Figures. In addition, such an implementation of a method could be carried out in accordance with the aspects illustrated in FIGS. 4A, 4B, and 4C. The method may include one or more operations, or actions as illustrated by one or more of blocks 300-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of the method, and operations of other methods and processes disclosed herein, may be performed at least in part by a computing device or computing system configured to control a robotic device and/or other components (e.g., sensors located remotely from the system) that are associated with the robotic device. For instance, operations of the method may be performed by one or more global control systems (e.g., one or more central planning systems, each configured to control and manage at least a portion of a fleet of robotic devices). Additionally or alternatively, operations of the method may be performed by a cloud computing system in communication with a global control system and/or with a fleet of robotic devices. Additionally or alternatively, operations of the method may be managed by a central server, which can distribute operations to smaller peer-to-peer networks or servers that may manage portions of the fleet of robotic devices. However, it should be understood that example methods, such as the methods shown in FIG. 3 and FIG. 5, may be carried out by other entities or combinations of entities (i.e., by a server, or by other computing devices and/or combinations of computing devices), without departing from the scope of the invention. Some operations of the method may also be described to be performed by a robotic device itself, although such language may refer in actuality to such operations being performed by a computing system configured to control the robotic device.

At block 300, the method involves determining a map of a plurality of robotic devices within a physical environment, where the map includes predicted future locations of at least some of the plurality of robotic devices. As discussed above, the plurality (e.g., a fleet) of robotic devices may include one or more different types of robotic devices, such as a static robotic device fixed at given location within the environment (e.g., a pedestal robot), or a dynamic robotic device configured to travel to multiple locations within the environment (e.g., an AGV). Such robotic devices may be controlled to perform tasks in coordination with each other.

Herein, a "map" refers to information representative of a positioning of elements in a particular area of an environment, and/or representative of a relationship of certain elements to other elements or to the environment. Within example embodiments, a map is a digital map, determined by collecting and compiling data representative of relationships between elements in the given environment, and then formatting such data into a virtual form, such as a virtual 2D or 3D image. A map can be a real-time or non-real-time representation of the elements and environment at issue, detailing such elements, the environment, and/or points of interest on such elements and/or in the environment.

The map determined by the control system may be an initial map indicating predicted locations where at least some of the robotic devices of the fleet are expected to be in the future. Within examples, a given predicted future location may include a single location in the environment at which a robotic device is predicted to be in the future. Within further examples, the given predicted future location may include multiple locations in the environment at which a robotic device is predicted to be in the future over time, such as a predicted future path or trajectory along which a robotic device may travel. For instance, a predicted future trajectory may be a default route of a robotic device assigned by the control system, a path deviating from a default route, and/or a trajectory independent from a default route. Within still further examples, given predicted future locations may include predicted future configurations of one or more appendages of at least some of the fleet of robotic devices, such as configurations that specify a rotation distance or angle of a robotic arm of a pedestal robot or robotic truck unloader, a position of a gripper coupled to the robotic arm, or a height of a forklift, among other possibilities. In practice, the "configuration" of a robotic arm or other appendage of a robotic device can be specified by a set of joint variables, which can include one or more joint angles or translation variables (e.g., for an arm/appendage with rotational joints and/or prismatic joints) to thereby specify an orientation of the arm/appendage). In line with the discussion above, the term "locations" may be used herein to collectively refer to locations, trajectories, and/or orientations of a robotic arm or other appendage.

Within additional examples, in determining a predicted future location (or locations, e.g., a trajectory comprising multiple locations over time) of a given robotic device or object included/shown in the map, the control system may determine a particular point in time in the future or multiple particular points in time in the future at which to expect the given robotic device or object to be at the predicted future location(s). Thus, the map may indicate the determined predicted locations as well as the corresponding determined particular time(s).

In practice, the control system may manage high-level planning of tasks to be performed by the fleet, including movement and other actions of the fleet. Such high-level planning may be used in various ways to determine the initial predicted future locations to be included in the initial map. The control system may have knowledge of high-level planned tasks for robotic devices of the fleet to perform, and thus may have knowledge of various locations and routes throughout the environment where robotic devices may be when performing the planned tasks. By way of example, the control system may have knowledge of a planned future time at which objects are to be delivered to a particular location in a warehouse, or a planned future time at which a shipment of objects is expected to arrive at or depart from the warehouse. As another example, the control system may assign default trajectories to robotic devices (or otherwise have knowledge of such default trajectories) through which those robotic devices may typically travel to facilitate a performance of a particular high-level planned task (e.g., a robotic device assigned a route to bring packages from a high-density storage rack to a truck for shipment). Other examples of predicting future locations of robotic devices are possible as well.

In addition to predicted future locations of robotic devices, the map may include predicted future locations of objects in the environment. Within examples, the control system may determine a predicted future location of an object based on predicted future locations of one or more robotic devices. For instance, a robotic device may be instructed to transport an object from one location to another, and thus the location/trajectory of that robotic device may indicate where the object is located or will be located while the object is being transported or after the object is being transported. The map may include other information as well, such as indications (e.g., images, markers on a map, etc.) of unidentified objects within the environment, of obstacles blocking a path of one or more robotic devices, of an inventory of objects or robotic devices within the environment, and of identified persons within the environment, among other possibilities.

Within examples, the map may take the form of a 2D and/or 3D representation of the environment, and/or may take the form of another type of data interpretable by the fleet of robotic devices as a map of the environment. Further, the map may include a visual indication of the predicted future locations or other data interpretable by the fleet as the predicted future locations.

At block 302, the method involves causing one or more robotic devices of the plurality to perform a task comprising one or more task phases. Herein, a "task" refers to an operation that is assigned to at least one entity for that entity or entities to perform. Within example embodiments, such a task is assigned to the at least one entity by a system that monitors, governs, or otherwise manages the at least one entity in order to facilitate a performance of the task by the at least one entity.

Within examples, performance of the task may be completed by at least two different types of robotic devices working in coordination to manipulate at least one object. A task (and associated task phases) involving a manipulation of an object or objects may take various forms. For example, a task may involve delivering objects directly from a starting location to a target location, or possibly transporting objects from a starting location to one or more intermediate locations before being finally delivered to the target location, handing off the objects from one robotic device to another at each intermediate location. As another example, a task may involve a simultaneous manipulation of an object or objects by two or more robotic device. As yet another example, a task may involve manipulating objects with tools or other accessories (e.g., one robotic device repairing or another robotic device. As yet another example, a task may involve opening boxes, a truck, or other means of storage and distributing objects within to various locations in the environment. In yet still further examples, tasks may involve any of the applications noted above, such as order fulfillment, cross-docking, etc.

Tasks which do not involve manipulation of objects are possible as well. For instance, tasks may involve coordinated navigation and movement of at least two robotic devices within the environment, such as sending robotic devices to a particular area in the environment to prepare for a future task to be performed. For example, the task may involve distributing robotic devices of the fleet throughout the environment (e.g., a group of robotic devices sent to a loading dock for loading/unloading trucks, a group of robotic devices sent to storage racks to load/unload heavy pallets from the racks, etc.). As another example, the task may involve sending groups of robotic devices out to provide assistance with an upcoming or ongoing task if such assistance is requested/needed. Other examples are also possible.

It should be understood that any of the tasks described herein can also be referred to as a task phase of a longer, larger-scale task as well.

Generally, causing robotic devices of the fleet to perform tasks (and task phases thereof) may be carried out in accordance with the central planning system configuration described above, where tasks (and task phases thereof) may be managed by the central planning system, which may work in conjunction with local robot systems to monitor a status of the performance of the tasks.

Despite the control system having knowledge of tasks that it has caused robotic devices of the fleet to perform, the control system may not have knowledge of tasks to be performed at lower levels (e.g., task phases). By way of example, the control system may know that at least two robotic devices are to coordinate to deliver an object from one end of a warehouse to another end of the warehouse, but may not have knowledge of where the respective robotic devices are located at all times throughout the performance of the delivery. In these types of scenarios, a robotic device may publish its location throughout a performance of a given task and/or publish other information relating to the performance of the given task and the progress thereof (e.g., notify the control system and/or other robotic devices). The robotic device may publish its location or other information at various points in time, such as periodically (e.g., at predefined, regular or equal intervals, or at irregular intervals), continuously, randomly, upon a task or task phase being completed, or in other manners.

As such, at block 304, the method involves, during a performance of at least one of the one or more task phases by the one or more robotic devices, receiving, from the one or more robotic devices, task progress data indicative of which of the one or more task phases have been performed by the one or more robotic devices. Generally, the task progress data may include data interpretable by the control system as an indication of a current state of at least a portion of the fleet of robotic devices in the environment, including one or more robotic devices involved in a performance of a particular task or task phase.

Within examples, the task progress data may include a time at which a particular task or task phase was completed, and the robotic device that completed the particular task or task phase may transmit the task progress data to the control system at the completion time or within a predetermined time window after the completion time. The task progress data may also indicate where the robotic device is/was when the particular task or task phase is/was completed, and may also indicate where other robotic devices and objects (e.g., other robotic devices and objects that were involved in a performance of the particular task or task phase) are located in the environment and/or indicate a predicted future location representative of where the other robotic devices and objects are travelling towards in the environment. Further, the task progress data may indicate a current configuration of a given robotic device, such as a configuration (i.e., a set of joint variables) of the given robotic device, a configuration of one or more robotic appendages of the given robotic device, and a heading of the given robotic device. Still further, the task progress data may indicate a current status of one or more robotic devices, such as a battery power level of a given robotic device or other diagnostic information, and/or information indicating a robotic appendage of the given robotic device that is not functioning correctly. It should be understood that information which may be indicated by the task progress data, including the information described above, may alternatively be transmitted to the control system at another time separate from the transmission of the task progress data.

Over time, as the control system receives the task progress data from various robotic devices, the control system may use the task progress data to adjust the initial predictions of when and where in the future robotic devices will complete a performance of a given task or complete a portion of the given task. For instance, the control system can use the task progress data to determine when and where in the environment robotic devices have deviated or will deviate from their respective default routes, and to determine/monitor where the robotic devices are and/or will be located with respect to their respective default routes. The control system may thus update the initial map to reflect these adjusted initial predictions.

At block 306, the method involves, based on the received task progress data, updating the map of the plurality of robotic devices within the physical environment, where the updated map includes at least one modification to the predicted future locations of at least some of the plurality of robotic devices. The updates to the map may include updates to the entire map and/or updates to portions of the map. For instance, only a portion of a map may be updated in scenarios such as when predicted future location(s) of robotic devices may be within an area of the environment corresponding to that portion of the map, and/or when an obstacle or unidentified object is present in the area, among other possible scenario, including scenarios where updating a larger portion of the map may be unnecessary with respect to time management and/or power management.

Within examples, the initial map may include data representative of predicted future times at which at least some of the plurality of robotic devices will be located at the respective predicted future locations, where each predicted future time corresponds to a respective predicted future location. Additionally or alternatively, the initial map may include data representative of such a correspondence between the predicted future locations and their respective predicted future times. As such, the computing system may update the initial map by determining the at least one modification to the predicted future locations of at least some of the plurality of robotic devices based on the received task progress data, and by determining the at least one modification to the predicted future times, determining at least one modification to the predicted future times and/or refining the correspondence between the predicted future locations and their respective predicted future times. The computing system may then include data representative of the determined at least one modification to the predicted future locations in the updated map. The computing system may also include data representative of the at least one modification to the predicted future times and/or may include data representative of the refined correspondence between the predicted future locations and predicted future times.

Within further examples, the map may include a visual representation of at least a portion of the physical environment, a visual representation of at least some of the plurality of robotic devices, and visual indications of the predicted future locations of at least some of the plurality of robotic devices, among other information to be published to the robotic devices (e.g., completion times of the tasks and/or task phases). As such, the map may be updated by updating the predicted future locations of at least some of the plurality of robotic devices and/or updating anticipated completion times corresponding to the modified predicted future locations at issue and corresponding to the task and/or task phase at issue. The updating of the map may also involve adjusting the visual indications of the predicted future locations to include visual indications of the updated predicted future locations, and updating at least a portion of the map to include the adjusted visual indications. Further, data representative of the updated anticipated completion times of the task and/or task phase at issue can be included as part of the updated map.

In further examples, a robotic device may publish its location (among other possible information) at least once throughout a performance of a task or task phase (e.g., periodically, continuously, etc.), which the control system can then use to determine the map, predict future locations of robotic devices and objects in the environment, and determine updates to the map including updates to the predicted future locations. For instance, when a robotic device is delayed in completing a task phase for reasons such as an unexpected obstacle to avoid or another robotic device failing to coordinate action with the robotic device on time, the robotic device may provide its location to the control system and/or the task progress data indicating that the task phase is still in progress, which the control system may use to adjust a predicted future location (e.g., to show an alternate route that will be taken by the robotic device) and/or a predicted completion time of the task phase (and possibly the entire task itself), among other possible adjustments/determinations. Other examples are possible as well.

In additional examples, when the predicted future locations include predicted future trajectories of at least some of the fleet of robotic devices, the control system may accordingly use the task progress data to modify the predicted future trajectories and include the modified predicted future trajectories in the updated map. Further, when the predicted future locations include predicted future configurations of one or more appendages of at least some of the fleet of robotic devices, such as a rotation distance or angle of a robotic arm of a pedestal robot that is involved in a performance of at least one of the task phases (e.g., picking up an object and loading the object in a truck), the control system may accordingly use the task progress data (e.g., the data indicating that the pedestal robot has picked up the object), the control system may modify the predicted future configurations of the one or more appendages and include the modified predicted future configurations in the updated map.

At block 308, the method involves, causing the one or more robotic devices to perform at least one other task phase in accordance with the updated map. For example, the control system or other computing entity configured to manage the fleet may use the map to determine instructions for the one or more robotic devices to perform the at least one other task phase. The control system may then transmit to the one or more robotic devices at least a portion of the updated map along with instructions for the one or more robotic devices to perform the at least one other task phase in accordance with at least the portion of the updated map. As another example, the control system may publish at least a portion of the updated map to the one or more robotic devices, which the one or more robotic devices may use to locally adjust or otherwise manage their movements and/or other actions accordingly to perform the at least one other task phase. The updated map may indicate to the one or more robotic devices where and when to anticipate locations and/or movement of other robotic devices, thereby facilitating performance of at least one other task phase in coordination with such other robotic devices.

Figure 4A:
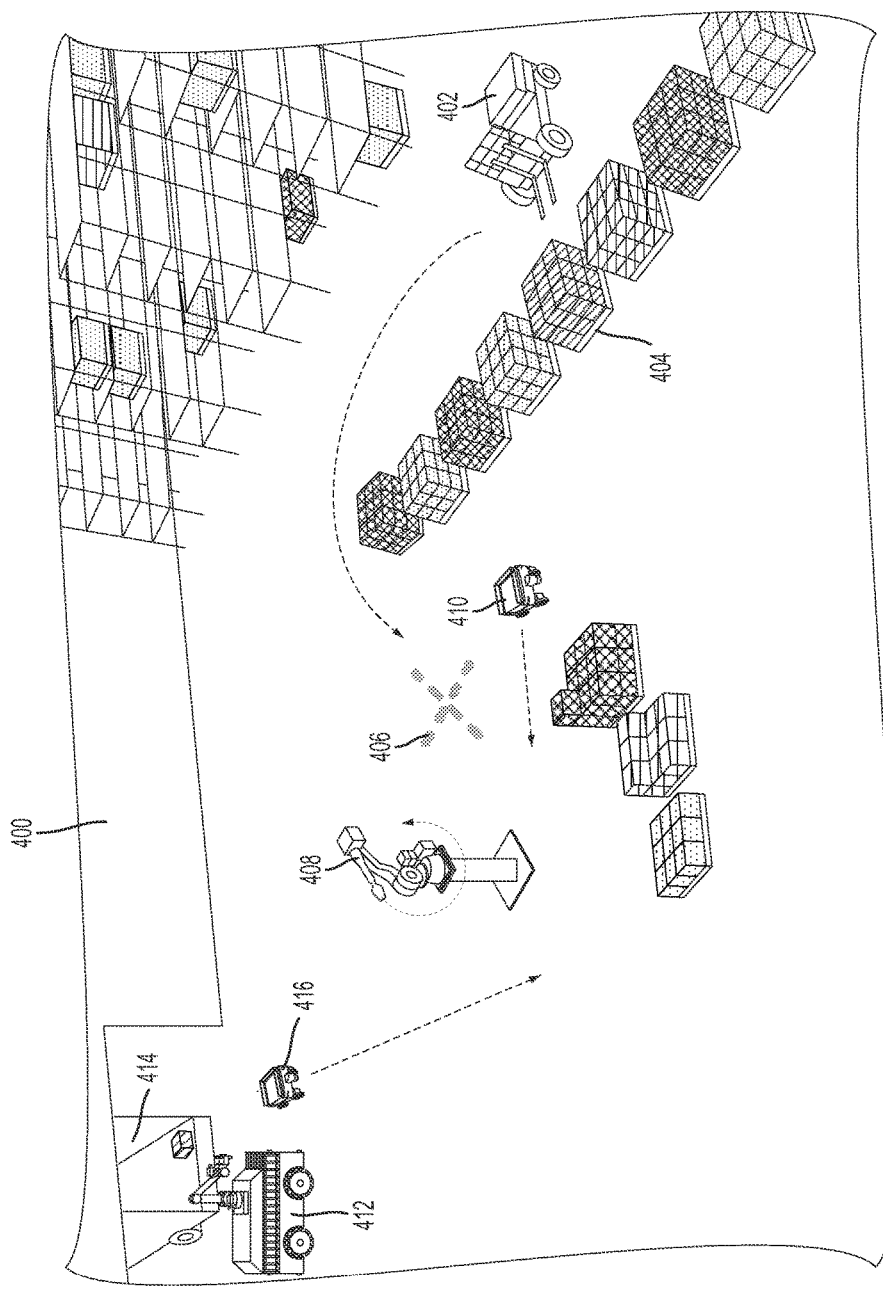
FIG. 4A illustrate example operation of a robotic fleet in a warehouse, in accordance with at least some implementations described herein.

FIG. 4A illustrates an example fleet of robotic devices operating in a warehouse 400 and implementing operations of the disclosed methods, where the example fleet is similar to the fleet illustrated in FIGS. 1A, 1B, 2A, 2B, 2C, and 2D. In the example shown in FIG. 4A, robotic devices of the fleet may be involved in a coordinated performance of at least one task phase, such as an autonomous fork truck 402 bringing a pallet of boxes 404 to a target location 406 for a pedestal robot 408 to load a particular box onto an AGV 410. Additional tasks/phases may be performed as well, such as the AGV 410 subsequently bringing the particular box to a robotic truck loader 412 for the robotic truck loader to load onto a truck 414. The fleet may also include a second AGV 416 that may not be involved in a coordinated performance of the specific tasks described above, and thus may not be included in the subset of robotic devices of the fleet. Prior to the coordinated performance of the tasks, the second AGV 416 may have had a box removed from it by the robotic truck unloader 412 and loaded into the truck 414, for instance. In line with the discussion above, performance of the tasks may be controlled and managed by a central planning system or subsystem associated with the robotic devices involved in a performance of the tasks.

Figure 4B:
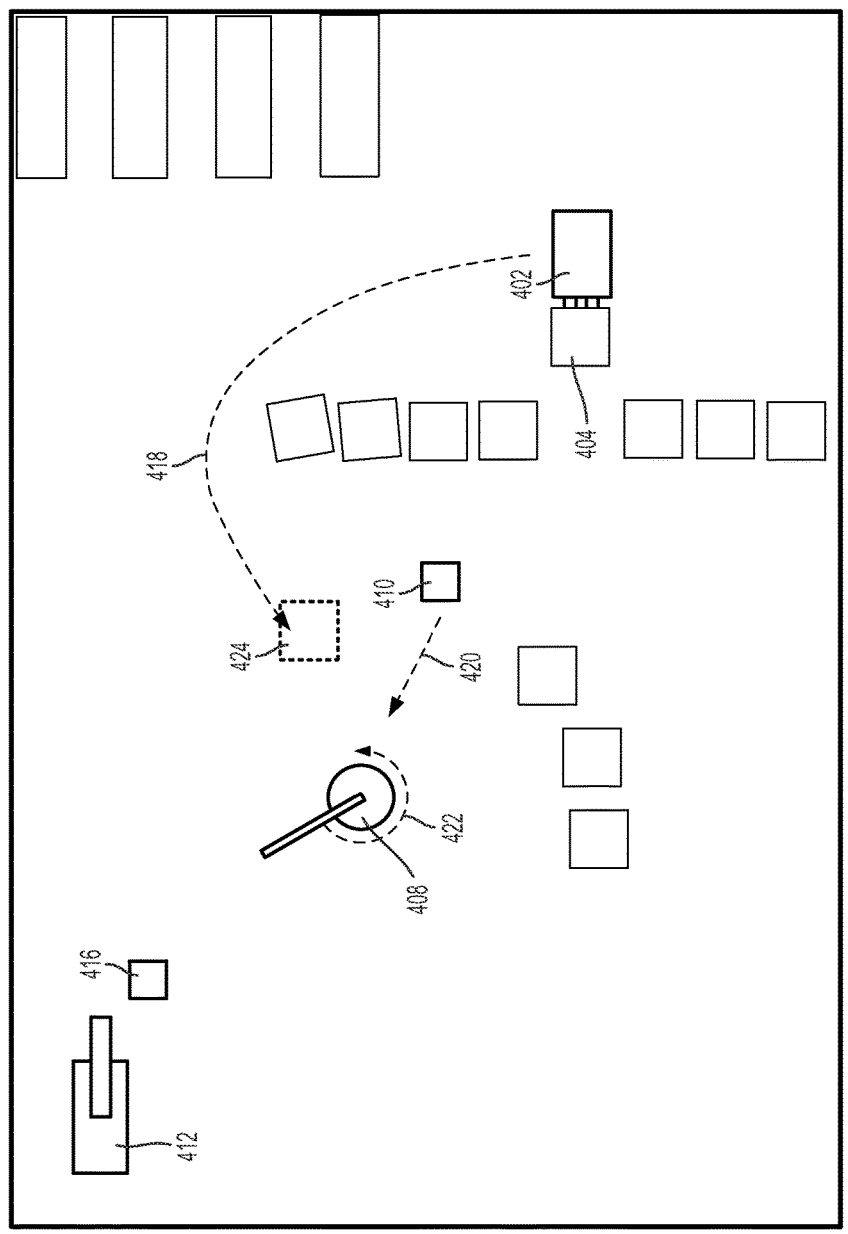
FIGS. 4B and 4C illustrate example maps of a robotic fleet operating in a warehouse, in accordance with at least some implementations described herein.
Figure 4C:
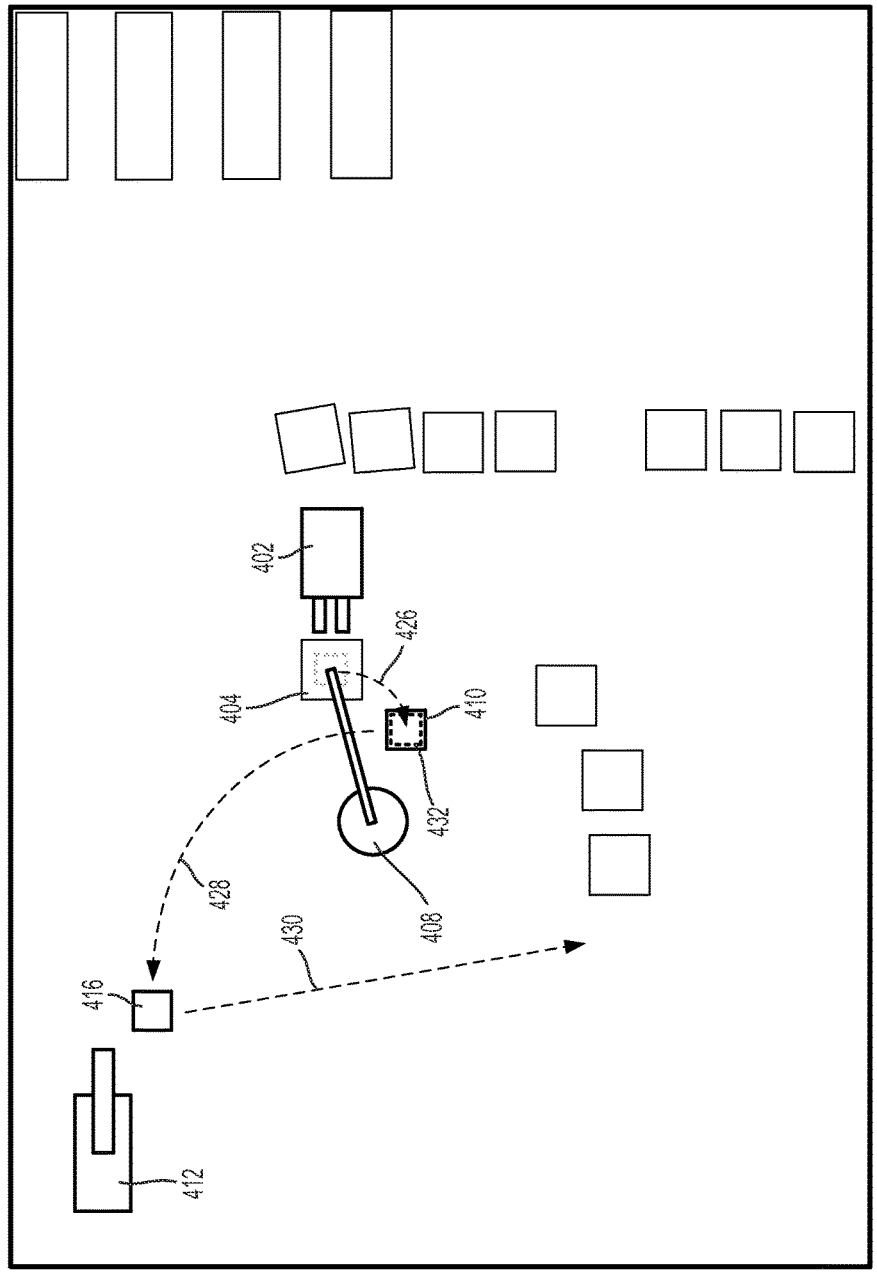

FIGS. 4B and 4C illustrate example maps associated with the robotic fleet operations described with respect to FIG. 4A. In particular, FIGS. 4B and 4C may illustrate a portion of a larger map of the warehouse 400, that may be published to any or all robotic devices of the fleet that have routes within the portion of the warehouse, that may operate near the portion of the warehouse, or that may otherwise operate in a manner in which it may be advantageous to publish a map of the portion to such robotic devices. It should be understood that while only two maps are show, other intermediate updated maps may be published during the performance of a task in some scenarios and may be referred to herein.

As shown, the maps of FIGS. 4B and 4C include representations of various robotic devices illustrated in FIG. 4A and representations of objects in the warehouse 400, such as pallets and storage racks. The map of FIG. 4B includes representations of predicted future trajectories 418, 420, and 422, of the autonomous fork truck 402, AGV 410 and pedestal robot 408, respectively. Further, the map includes a representation of a predicted future location 424 of pallet 404. In particular, the map of FIG. 4B (as well as the map of FIG. 4C, or other maps described but not shown herein) may show predicted future locations and trajectories at a particular point in time in the future, or multiple particular points in time in the future. Thus, the maps may indicate to the robotic devices where and when to perform respective task phases (e.g., the pedestal robot 408 will know when pallet 404 will be located near the pedestal robot so the pedestal robot can prepare to or begin to unload boxes from the pallet).

As part of the task, the autonomous fork truck 402 may be predicted to travel along trajectory 418 to deliver pallet 404 to predicted future location 424. Further, the AGV 410 may be predicted to travel from its current location along trajectory 420 to be loaded by the pedestal robot 408 with a box from pallet 404 after pallet 404 is delivered to predicted future location 424. Accordingly, the pedestal robot 408 may be predicted to rotate along trajectory 422 to place its robotic arm in a position to unload a box from pallet 404 and load the box onto the AGV 410.

One or more of the predicted trajectory movements may occur simultaneously or may otherwise be coordinated with each other in order to perform a task or task phase (e.g., coordinated, but non-simultaneous). For instance, based on the map including at least predicted future trajectory 418 and being published to the pedestal robot 408, the pedestal robot may know to rotate along predicted future trajectory 422 to be in a position to unload the box once pallet 404 arrives at predicted future location 424.

During a performance of a larger task of having a box from pallet 404 brought to and loaded on a truck (not illustrated/represented in FIGS. 4B and 4C), or during performance of a task phase of the larger task, the autonomous fork truck 402 may transmit task progress data to the planning system, where the task progress data may include, for instance, an indication that the autonomous fork truck has picked up the pallet 404. The task progress data may be transmitted in response to the autonomous fork truck 402 detecting and scanning a radio frequency identification (RFID) tag contained on the pallet 404 and/or one or more boxes known to be located as part of pallet 404 and may include an indicator that the RFID tag was scanned and where the scanning occurred. Thus, the task progress data may notify the planning system of a current location of pallet 404 and responsively enable the planning system to update the map with predicted future trajectory 418, predicted future location 424, and possibly update completion times of the larger task or the task phase of the autonomous fork truck 402 bringing pallet 404 to predicted future location 424. Further, in response to receiving this task progress data, the planning system may predict that the box, being of a particular product type, will be loaded onto the truck in the near term and thus may increase a predicted future inventory of the particular product on the truck by one and may decrease a predicted future inventory of the particular product in the warehouse storage by one.

The updated map of FIG. 4C includes representations of predicted future trajectories 426, 428, and 430, of the pedestal robot 408, the AGV 410, and the second AGV 416, respectively. Further, the map includes a representation of a predicted future location 432 of a box removed from pallet 404. As part of the task, the pedestal robot 408 may be predicted to rotate along trajectory 426 to load the box from pallet 404 into AGV 410. Further, the AGV 410 may be predicted to travel along trajectory 428 to bring the box to the robotic truck loader 412 for the robotic truck loader to load the box into the truck. Still further, the second AGV 416 may be predicted to travel along trajectory 430 in order to move out of the way of AGV 410 and possibly later move to a location proximate to the pedestal robot 408 to be loaded with a box from a pallet. Accordingly, at some point in time during the performance of the task, the planning system may update the map to modify a previously-determined predicted future trajectory of the second AGV 416, thereby resulting in predicted future trajectory 430.

The second AGV 416 may not be involved in the task of having a box from pallet 404 brought to and loaded on a truck, but may be involved in other tasks that are performed in an area of the warehouse 400 that coincides with the area in which other tasks are performed, and thus a planning system configured to control and manage the second AGV may publish a map for the second AGV. In particular, the map shown in FIG. 4C may be published to the second AGV 416, or a variation thereof, such as a map including at least predicted future trajectory 428. The second AGV 416 may thus be enabled to move out of the way of AGV 410 so that AGV 410 can be unloaded by the robotic truck loader 412. Further, the map may be published to the robotic truck loader 412 and the AGV 410 so that each robotic device is aware of each other's upcoming future location, thereby facilitating a coordinated task phase of the robotic truck loader 412 unloading the box from the AGV and loading the box onto the truck. Within examples, if the AGV 410 or any other robotic device involved in the task is delayed (e.g., encounters an obstacle), the completion time of the task may be adjusted accordingly based on updates to the map reflecting the delay and reflecting any predicted future locations that are modified accordingly.

Other example tasks and corresponding map updates and scenarios are possible as well, in addition to or alternative to those described with respect to FIGS. 4A, 4B, and 4C.

Within examples, the received task progress data may include a message indicating a completion of a performance of a given task phase. Accordingly, the control system may cause at least one of the one or more robotic devices to perform another task phase consecutive to the given task phase responsive to the message indicating the completion of the performance of the given task phase. Within other examples, an entire new task may be performed based on the received task progress data including a message indicating a completion of a performance of a task or the control system otherwise determining that a performance of the task has been completed. In response to such a determination, the control system may update the map to indicate, or otherwise notify robotic devices of, a completion of the performance of the task. The control system may then select a subsequent task to be performed from a plurality of tasks, and cause one or more robotic devices of the fleet to perform the subsequent task. The control system may select the subsequent task in accordance with the updated map. For instance, the updated map may indicate that a group of robotic devices may be predicted to be located within or proximate to an area of interest of the environment in which the group could perform a given task, such as picking up objects that had accidentally been dropped by other robotic devices and that were obstacles affecting the routes of other robotic devices in the area of interest. Thus, the control system may cause the group to perform the given task based on such an indication in the updated map. Other examples are possible as well.

Within examples, the control system may determine an anticipated completion time of a performance of the task based on the determined map. Then, after updating the map and/or responsive to receiving task progress data, the control system may update the anticipated completion time of the performance of the task. Likewise, the control system may determine an anticipated completion time of a performance of at least one task phase. Then, after updating the map and/or responsive to receiving task progress data, the control system may update the anticipated completion times of the performance of at least one task phase.

Within examples, the control system, a cloud-based computing system, or other entity configured to manage at least a portion of the fleet of robotic devices may maintain a queue of updates to the map. Each update to the map maintained in the queue may include data specifying, for instance, a time at which to publish the update to a given robotic device of the fleet and/or a prioritization indicative of which robotic devices of the fleet should receive the update before other robotic devices of the fleet. The control system can then publish the updates maintained in the queue in accordance with the specified times and/or priority levels.

In some scenarios, the specified time at which an update is to be published to a given robotic device may depend on various factors, such as a time at which the given robotic device queried the control system for an update to its current map, which the given robotic device may have transmitted to the control system for various reasons (e.g., an error with a current map, an obstacle encountered, an unidentified object, etc.). As such, causing the one or more robotic devices to perform the at least one other task phase may be performed in response to the control system receiving the query, and may involve the control system transmitting at least a portion of the updated map to the one or more robotic devices along with instructions for the one or more robotic devices to perform the at least one other task phase in accordance with at least the portion of the updated map (e.g., instructions to travel to and pick up an object that has recently been dropped by another robotic device), for instance.

In these and other scenarios, the control system may determine a prioritization of the fleet of robotic devices, which defines relative priority levels among the fleet of robotic devices, each robotic device having a corresponding priority level. The control system may thus transmit updates to at least a portion of the map in accordance with the determined prioritization, transmitting updates to robotic devices that have higher priority levels before transmitting updates to robotic devices that have lower priority levels, for instance. The control system may take into account various factors when determining the prioritization, one or more of which may be used in combination. Within examples, when a performance of the at least one other task is to occur within an area of interest of the environment (e.g., a loading dock, a storage area, a weighing station, a portion of an assembly line, etc.), the prioritization may be determined by the control system first determining whether each of at least a portion of the fleet of robotic devices is involved in the performance of the task (i.e., whether each is known to be involved or predicted to be involved). At a minimum, in such examples, the control system may prioritize robotic devices that are involved in the performance of the task to be higher than robotic devices that are not involved in the performance of the task.

Within further examples, the prioritization may be determined by determining respective distances from each robotic device to the area of interest, respective anticipated times each robotic device will take to reach the area of interest, and/or whether respective anticipated trajectories of each robotic device include a least a portion of the area of interest (e.g., whether a robotic device will travel through the area of interest and/or will come into contact with robotic devices or objects that occupy the area of interest). The control system may determine such anticipated trajectories and times, for instance, based on the predicted future locations included in the map and its updates. In accordance with such examples, the control system may prioritize robotic devices to be higher when those robotic devices have a more immediate need to be informed of the updates to the map, especially updates to the map corresponding to the area of interest, as opposed to prioritizing robotic devices to be lower when those robotic devices have a less immediate need or an entire lack of a need to be informed of the updates. In particular, the priority levels assigned to the robotic devices may be correlated to distance, time, and/or other variables.

Within further examples, the control system may take into account a version number of a map of a given robotic device or other indicator of a state of the map of the given robotic device when determining a priority level for the given robotic device. For instance, while control system may globally update the respective maps of all robotic devices substantially at the same time, the control system may first update robotic devices with older versions of their respective maps. Other factors for determining prioritization are possible as well.

In practice, a given robotic device may transmit a message to the control system or other entity to indicate to the control system the given robotic device's distance from the area of interest, its map version number, and/or other factors discussed above. However, a given robotic device may indicate such information to the control system in other manners as well, and/or the control system may determine such information about each robotic device in other manners.

It should be understood that in some scenarios, certain updates may be made to portions of the map that apply only to a first group of robotic devices, and that other, different updates may be made to other portions of the map that apply to a second group of robotic devices which may or may not include members of the first group of robotic devices. In such scenarios, some robotic devices may have different versions of maps than others, each version including updates relevant to particular robotic devices.

Within examples, an area of interest may be defined by an obstacle or other blockage in the environment and a region within a predetermined distance from the obstacle or blockage. A robotic device may identify the obstacle and publish (either directly itself or indirectly via the control system by first notifying the control system of the obstacle) an indication of the obstacle (e.g., an update to the map, a notification, or other data interpretable by the robotic devices and/or the control system as an obstacle) so that the control system and other robotic devices can plan accordingly without having to travel near or in the area of interest and identify the obstacle themselves. In such examples, robotic devices whose current and/or predicted future trajectories bring them within a predetermined threshold distance from the obstacle may be prioritized higher to receive the published update to the map, since it may be desirable for such robotic devices to adjust their movement accordingly to avoid or remove the obstacle. Further, in such examples, the published map update may include the obstacle and/or predicted future locations of robotic devices that may be modified based on the presence of the obstacle.

In line with the discussion above, a task may be initiated in response to a completion of another task. However, a task can also be initiated in response to a robotic device making a local determination using local vision. For instance, a robotic device may detect that nearby autonomous fork trucks may not be carrying pallets and may notify the control system, which may then initiate a task for such autonomous fork trucks to pick up pallets. The robotic device which makes the detection may be a pedestal robot, for instance, or may be an autonomous fork truck itself.

Additionally or alternatively to tasks involving robotic devices moving objects in the environment, some tasks may involve repairing or otherwise improving performance of the robotic devices. As an example, while travelling in the environment (and possibly performing another task), a given robotic device may run low on battery power or may have a broken component and may notify the control system of its current location, its battery power level, which component is broken, and/or other relevant information. The control system may responsively publish an update to the map to the given robotic device. Further, the control system may responsively publish the update to a repair robotic device (e.g., a "medic-bot") that may be configured to perform tasks such as repairing broken components of the given robotic device and/or bringing a new battery to the given robotic device and replacing the old battery. Still further, the control system may responsively publish the update to one or more robotic devices whose trajectories or other actions may be affected by the given robotic device and/or by the repair robotic device (e.g., robotic devices may have to avoid the given robotic device if it is stopped in a crowded area and/or may have to avoid the repair robotic device so as not to delay the repair robotic device from arriving at or returning from the given robotic device's location). Other tasks may be performed as well, such as a repair robotic device or other robotic device picking up a broken robotic device or other static object and removing it from the environment.

In additional examples, the environment may include a plurality of objects. As such, the control system can determine, maintain, and update a map including current locations of objects and predicted future locations of objects. An example method relating to such functionality is described in FIG. 5.

Figure 5:
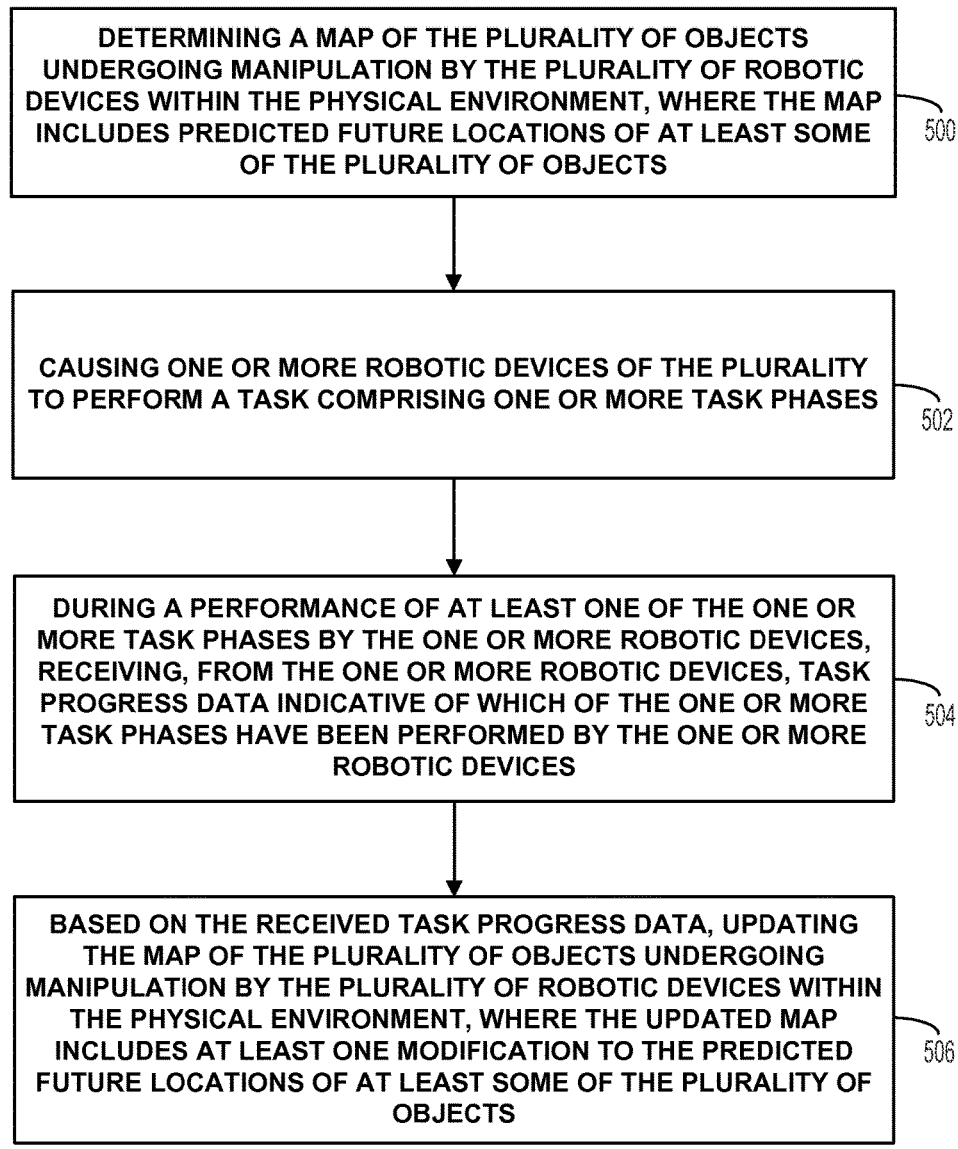
FIG. 5 is a flow chart of another example method, in accordance with at least some implementations described herein.

FIG. 5 is a flow chart of another example method, in accordance with at least some implementations described herein. Namely, the method shown in FIG. 5 includes operations for dynamically maintaining a map of a plurality of objects in an environment in which a fleet of robotic devices operate, as described above. The method shown in FIG. 5 presents an implementation of a method that, for example, could be used with the systems shown in FIGS. 1A, 1B, 2A, 2B, 2C, and 2D, for example, or may be performed by a combination of any components of those Figures. In addition, such an implementation of a method could be carried out in accordance with the aspects illustrated in FIGS. 4A, 4B, and 4C, as described above. The method may include one or more operations, or actions as illustrated by one or more of blocks 500-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 500, the method involves determining a map of the plurality of objects undergoing manipulation by the plurality of robotic devices within the physical environment, where the map includes predicted future locations of at least some of the plurality of objects.

At block 502, the method involves causing one or more robotic devices of the plurality to perform a task comprising one or more task phases. Such a task may involve a manipulation of at least one object of the plurality of objects, for instance.

At block 504, the method involves, during a performance of at least one of the one or more task phases by the one or more robotic devices, receiving, from the one or more robotic devices, task progress data indicative of which of the one or more task phases have been performed by the one or more robotic devices.

At block 506, the method involves, based on the received task progress data, updating the map of the plurality of objects undergoing manipulation by the plurality of robotic devices within the physical environment, wherein the updated map includes at least one modification to the predicted future locations of at least some of the plurality of objects.

Within examples, the method may further involve causing the one or more robotic devices to perform at least one other task phase in accordance with the updated map. For instance, the updated map may include a predicted future location of a particular object that is proximate to a location of a pedestal robot, based on an autonomous fork truck reporting its location while en route to deliver a pallet of objects including the particular object at the location proximate to the pedestal robot. The control system may publish the updated map to at least one AGV, which the AGV may use as a basis for determining that it should travel to a location near the pedestal robot so that the pedestal robot can pick up the particular object off the pallet and load it onto the AGV for the AGV to transport elsewhere. Other examples are possible as well.

Within examples, the environment may include multiple different warehouses, where and the plurality of objects may include products to be shipped or otherwise transported out of the warehouses. Based on the determined map and the predicted future locations of the plurality of objects, the control system may determine a current and/or predicted future inventory of a particular type of product at a particular warehouse of the multiple warehouses. The control system may determine that a product of the particular type is present in the environment and where in the environment the product is located, for instance, based on that product having its visual tag detected and scanned by a robotic device. Based on an updated map that modifies predicted future locations of the products, the control system may adjust the predicted future inventory of the particular type of product at the particular warehouse to reflect changes to a number of objects of the particular type of product. For instance, based on a performance of a task where twenty products of the particular type are being loaded onto a truck that will leave the particular warehouse, the control system may reduce the total number of the predicted inventory by twenty.

It should be understood that the control system may determine predicted future inventories of objects within regions of the warehouses themselves. For instance, the control system, or perhaps another control system arranged to monitor objects and robotic devices in a smaller, particular region of the particular warehouse, may determine predicted future inventories of objects stored within the particular region.

Within examples, the control system may adjust a predetermined trajectory of at least one robotic device based on a predicted future inventory, such as rerouting a group of robotic devices to work in coordination to pick up and deliver objects to avoid shortages. For instance, if the control system determines that the predicted future inventory of the particular type of product at the particular warehouse is less than a required amount, the control system may publish an update of locations of products of the particular type at other warehouses of the multiple warehouses. In particular, the control system may publish the update to robotic devices at the other warehouses, and may instruct such robotic devices to bring such products to the particular warehouse in order to increase the inventory to reach the required amount. As another example, if the control system determines that the predicted future inventory of a particular pallet of the particular type of product will be low or empty in the near future, the control system may reroute a robotic device to either remove the pallet when it is low/empty, or to bring more objects of the particular type to be placed onto the particular pallet.

Within examples, the task may involve a delivery of the at least one object of the plurality to a target location. Thus, based on the determined map, the control system may determine an anticipated completion time of a performance of the delivery to the target location by the one or more robotic devices, and may update the anticipated completion time of the performance of the delivery to the target location in accordance with the updated map, based on updates to the predicted future locations of the objects and/or predicted future locations of the one or more robotic devices that are working in coordination to deliver the at least object to the target location.

In line with the discussion above with respect to visual tags, during the performance of the at least one of the one or more task phases by the one or more robotic devices, the control system may receive, from the one or more robotic devices, data indicating a detection of visual tags, such as RFID tags, contained on objects by the local vision of the one or more robotic devices. As such, the control system can update the map of the objects based on the detected visual tags, in addition to updating the map based on the task progress data. Detection of the visual tags may help localize objects, such as during a search for and recovery of a lost item and/or determining that an object is located where it shouldn't be.

Furthermore, detection of the visual tags can be used to determine a map of robotic devices that transport such objects. For instance, as a first robotic device hands over an object to a second robotic device, the second robotic device may scan an RFID tag on the object and notify the control system that the RFID tag has been scanned and possibly a location where the scanning of the RFID occurred. This notification may indicate to the control system that the second robotic device has successfully received the object and thus the control system can determine a predicted future location of where the second robotic device may be in the near term Further, this notification may indicate to the control system that the first robotic device has successfully handed the object over to the second robotic device, and the control system may know that the first robotic device is located where the scan of the RFID tag occurred. The RFID tags or other visual tags may serve other purposes as well, and may facilitate a prediction of future actions of the fleet.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
    determining a digital map representative of a physical environment and of a first robotic device and a second robotic device within the physical environment, wherein the digital map includes an indication of a predicted future location of the first robotic device and a predicted time at which the first robotic device will arrive at the predicted future location;
    causing the first robotic device to perform a task comprising a plurality of task phases, the plurality including a coordinated task phase to be performed with the second robotic device, the coordinated task phase comprising a transfer of an object between the first and second robotic devices;
    during a performance of at least one of the plurality of task phases by the first robotic device, receiving, from the first robotic device, task progress data indicative of which of the plurality of task phases, other than the coordinated task phase, have been performed by the first robotic device;
    based on the received task progress data, updating the digital map to include an indication of a change in one or more of the predicted future location and the predicted time; and
    based on the updated digital map indicating the change, causing the second robotic device to perform the coordinated task phase with the first robotic device at one or more of the changed predicted future location and the changed predicted time.

2. The method of claim 1,
    wherein the physical environment includes the object,
    wherein the digital map further includes predicted future locations of the object, and
    wherein the updated digital map includes at least one modification to the predicted future locations of the object.

3. The method of claim 1, wherein the predicted future location of the first robotic device includes a predicted future trajectory of the first robotic device, and
    wherein the change in the predicted location includes a change in the predicted future trajectory.

4. The method of claim 1, wherein the predicted future location of the first robotic device includes a predicted future set of joint variables of an appendage of the first robotic device, and
    wherein the change in the predicted future location of the first robotic device includes a change in the predicted future set of joint variables of the appendage.

5. The method of claim 1, further comprising:
    based on the determined digital map, determining an anticipated completion time of a performance of the task by the first robotic device; and
    based on the updated digital map, updating the anticipated completion time of the performance of the task.

6. The method of claim 5, wherein the performance of the task involves the object being delivered by the first robotic device to a target location after the transfer of the object is complete.

7. The method of claim 1, wherein the task is a first task, wherein the plurality of task phases is a first plurality of task phases, and wherein the second robotic device is configured to perform a task comprising a second plurality of task phases, the second plurality including the coordinated task phase, the method further comprising:
    based on the determined digital map, determining an anticipated completion time of performance of at least one of the plurality of task phases by the first robotic device; and
    based on the updated digital map, updating an anticipated completion time of performance by the second robotic device of at least one task phase of the second plurality, other than the coordinated task phase.

8. The method of claim 1, performed by a cloud computing system that is in communication with the first and second robotic devices, the method further comprising:
    maintaining a queue of updates to the digital map, wherein each update to the digital map in the queue includes data specifying a time at which to publish the update to a given robotic device of the first and second robotic devices; and
    publishing updates maintained in the queue in accordance with the specified times.

9. The method of claim 1, wherein the first robotic device and the second robotic device are two different types of robotic devices.

10. The method of claim 1, further comprising:
    based on the updated digital map indicating the change, causing the second robotic device to perform, before the first robotic device and the second robotic device meet to transfer the object, a task involving preparation by the second robotic device to transfer the object.

11. A system comprising:
    a first robotic device within a physical environment;
    a second robotic device within the physical environment;
    at least one processor; and
    data storage comprising instructions executable by the at least one processor to cause the system to perform operations comprising:
    determining a digital map representative of the physical environment and of the first and second robotic devices within the physical environment, wherein the digital map includes an indication of a predicted future location of the first robotic device and a predicted time at which the first robotic device will arrive at the predicted future location;
    causing the first robotic device to perform a task comprising a plurality of task phases, the plurality including a coordinated task phase to be performed with the second robotic device, the coordinated task phase comprising a transfer of an object between the first and second robotic devices;

during a performance of at least one of the plurality of task phases by the first robotic device, receiving, from the first robotic device, task progress data indicative of which of the plurality of task phases, other than the coordinated task phase, have been performed by the first robotic device;

based on the received task progress data, updating the digital map to include an indication of a change in one or more of the predicted future location and the predicted time; and based on the updated digital map indicating the change, causing the second robotic device to perform the coordinated task phase with the first robotic device at one or more of the changed predicted future location and the changed predicted time.

12. The system of claim 11, wherein the second robotic device is a robotic arm having a fixed base at given location within the physical environment and the first robotic device is a dynamic robotic device configured to travel to multiple locations within the physical environment, and wherein the change in one or more of the predicted future location and the predicted time includes a change in one or more of the predicted future location and the predicted time of the robotic arm.

13. The system of claim 11, wherein causing the second robotic device to perform the coordinated task phase with the first robotic device at one or more of the changed predicted future location and the changed predicted time based on the updated digital map indicating the change comprises, transmitting, to the second robotic device, at least a portion of the updated digital map along with instructions for the second robotic device to perform the coordinated task phase with the first robotic device at one or more of the changed predicted future location.

14. The system of claim 11, the operations further comprising:

receiving, from the second robotic device, a query for an updated map, wherein causing the second robotic device to perform the coordinated task phase with the first robotic device at one or more of the changed predicted future location and the changed predicted time based on the updated digital map indicating the change comprises, in response to receiving the query, transmitting, to the second robotic device, at least a portion of the updated map along with instructions for the second robotic device to perform the coordinated task phase with the first robotic device at one or more of the changed predicted future location.

15. The system of claim 11, wherein receiving the task progress data includes receiving, from the first robotic device, a message indicating a completion of a performance of a given task phase of the plurality of task phases.

16. The system of claim 11, the operations further comprising:

making a determination that a performance of the task has been completed;

in response to the determination, updating the digital map to indicate a completion of the performance of the task;

based on the updated map, selecting a subsequent task to perform; and causing the first robotic device to perform the subsequent task.

17. The system of claim 11, the operations further comprising:

determining a prioritization of the first robotic device and another robotic device that is different from the second robotic device, the prioritization defining relative priority levels among the first robotic device and the other robotic device, wherein the prioritization is based on a determination of the first robotic device being involved in a performance of the task and the other robotic device not being involved in the performance of the task; and transmitting the updated digital map to the first robotic device and the other robotic device in accordance with the determined prioritization.

18. The system of claim 11, further comprising a plurality of other robotic devices within the physical environment, wherein a performance of the coordinated task phase involves a performance of the coordinated task phase within an area of interest of the physical environment, the operations further comprising:

determining a prioritization of the plurality of other robotic devices, the prioritization defining relative priority levels among the other robotic devices of the plurality, wherein the prioritization is based on a determination of one or more of: respective distances from each of the plurality of other robotic devices to the area of interest, respective anticipated times each of the plurality of other robotic devices will take to reach the area of interest, and whether respective anticipated trajectories of each of the plurality of other robotic devices include a least a portion of the area of interest; and transmitting the updated digital map to the plurality of other robotic devices in accordance with the determined prioritization.

19. The system of claim 11, wherein the first robotic device is a robotic arm having a fixed base at given location within the physical environment and the second robotic device is a dynamic robotic device configured to travel to multiple locations within the physical environment, and wherein the change in one or more of the predicted future location and the predicted time includes a change in one or more of the predicted future location and the predicted time of the robotic arm.

* * * * *